United States Patent
Fosbinder

(10) Patent No.: US 12,551,962 B2
(45) Date of Patent: *Feb. 17, 2026

(54) ENGINE-DRIVEN AIR COMPRESSOR/GENERATOR LOAD PRIORITY CONTROL SYSTEM AND METHOD

(71) Applicant: Illinois Tool Works Inc., Glenview, IL (US)

(72) Inventor: Daniel C. Fosbinder, Neenah, WI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/977,072

(22) Filed: Oct. 31, 2022

(65) Prior Publication Data

US 2023/0302564 A1 Sep. 28, 2023

Related U.S. Application Data

(63) Continuation of application No. 14/182,137, filed on Feb. 17, 2014, now Pat. No. 11,484,959, which is a
(Continued)

(51) Int. Cl.
*B23K 9/10* (2006.01)
*F02B 63/02* (2006.01)
(Continued)

(52) U.S. Cl.
CPC ............ B23K 9/1006 (2013.01); F02B 63/02 (2013.01); F02B 63/04 (2013.01); F02B 63/06 (2013.01); F02B 63/048 (2013.01)

(58) Field of Classification Search
CPC .. B23K 9/1006; B23K 9/0953; B23K 9/0956; B23K 9/1081; F02B 63/04; F02B 63/048; F02B 63/02; F02B 63/06
(Continued)

(56) References Cited

U.S. PATENT DOCUMENTS

| | | | | |
|---|---|---|---|---|
| 1,991,073 A | * | 2/1935 | Blankenbuehler ..... | G05D 13/00 219/133 |
| 1,991,078 A | * | 2/1935 | Brown .................. | G05D 13/00 315/303 |

(Continued)

FOREIGN PATENT DOCUMENTS

| | | |
|---|---|---|
| EP | 0041585 | 12/1981 |
| JP | 10115225 | 5/1998 |
| WO | 0014392 | 3/2000 |

OTHER PUBLICATIONS

Certified Truck Bodies Original Products; www.certifiedtruckbodies.com/pages_single/compressors.htm, Jul. 24, 2007.
(Continued)

*Primary Examiner* — Steven W Crabb
*Assistant Examiner* — Alba T Rosario-Aponte
(74) *Attorney, Agent, or Firm* — McAndrews Held & Malloy, Ltd.

(57) ABSTRACT

A system, in one embodiment, may include a portable unit having an engine, a generator coupled to the engine, a compressor coupled to the engine, and a priority load controller. The controller may be configured to adjust various loads on the engine, the generator, or the compressor, or a combination thereof, in response to a priority control scheme. A computer-implemented method, in another embodiment, may include adjusting power output to various loads on an engine, a welding generator coupled to the engine, or an air compressor coupled to the engine, or a combination thereof, in a portable welding unit in response to a priority control scheme.

16 Claims, 6 Drawing Sheets

Related U.S. Application Data continuation of application No. 11/742,399, filed on Apr. 30, 2007, now Pat. No. 8,653,415.

(51) Int. Cl.
*F02B 63/04* (2006.01)
*F02B 63/06* (2006.01)

(58) Field of Classification Search
USPC ........ 219/133, 130.1, 136, 137 PS; 700/291, 700/293, 299, 5; 290/1 A, 52, 40 R, 290/40 C, 40 B
See application file for complete search history.

(56) References Cited

U.S. PATENT DOCUMENTS

| | | | |
|---|---|---|---|
| 4,367,130 A * | 1/1983 | Lemelson | G21B 3/008 |
| | | | 422/186 |
| 5,591,362 A | 1/1997 | Feldhausen | |
| 6,099,265 A | 8/2000 | Rowejr | |
| 6,534,958 B1 * | 3/2003 | Graber | F02D 29/06 |
| | | | 322/11 |
| 6,603,097 B2 | 8/2003 | Leisner | |
| 6,989,509 B2 | 1/2006 | Silvestro | |
| 7,098,424 B2 | 8/2006 | Silvestro | |
| 8,653,415 B2 * | 2/2014 | Fosbinder | B23K 9/1006 |
| | | | 219/133 |
| 11,484,959 B2 * | 11/2022 | Fosbinder | F02B 63/04 |
| 2005/0133489 A1 | 6/2005 | Gitter | |
| 2005/0263513 A1 | 12/2005 | Leisner | |
| 2005/0263515 A1 | 12/2005 | Fosbinder | |
| 2006/0016791 A1 | 1/2006 | Fosbinder | |
| 2006/0027547 A1 * | 2/2006 | Silvestro | B23K 9/323 |
| | | | 219/133 |
| 2006/0157459 A1 | 7/2006 | Fosbinder | |
| 2006/0215389 A1 * | 9/2006 | Fosbinder | G09F 9/35 |
| | | | 362/85 |
| 2006/0284604 A1 | 12/2006 | Qi | |
| 2008/0264919 A1 | 10/2008 | Helf | |
| 2008/0264921 A1 | 10/2008 | Kropp | |

OTHER PUBLICATIONS

The Space Saver by Certified Truck Bodies; www.certifiedtruckbodies.com.

* cited by examiner

PRIORITY:
    1) AC GENERATOR POWER
    2) WELDING GENERATOR POWER
    3) AIR COMPRESSOR POWER
    4) BATTERY CHARGER GENERATOR POWER

PRIORITY SCHEME:
    1) REDUCE BATTERY CHARGER POWER
    2) REDUCE COMPRESSOR POWER
    3) REDUCE WELDING POWER
    4) REDUCE BATTERY CHARGER POWER
    5) REDUCE COMPRESSOR POWER
    6) REDUCE WELDING POWER
       ⋮
    10) REMOVE BATTERY CHARGER POWER
    11) REMOVE COMPRESSOR POWER
    12) REMOVE WELDING POWER
    13) REDUCE AC POWER

FIG. 6

ENGINE-DRIVEN AIR COMPRESSOR/GENERATOR LOAD PRIORITY CONTROL SYSTEM AND METHOD

CROSS-REFERENCE TO RELATED APPLICATIONS

This application is a continuation application of U.S. application Ser. No. 11/742,399, entitled "Engine-Driven Air Compressor/Generator Load Priority Control System and Method", filed Apr. 30, 2007, which is herein incorporated by reference in its entirety for all purposes.

BACKGROUND

The invention relates generally to welding systems and more particularly to welding systems utilizing an engine coupled to an air compressor, a welding generator, and possibly other loads.

Welding systems generally use an electrical current (e.g., welding current) to perform welding. The electrical current may be provided by an electrical power source (such as a power grid or battery) or an electrical generator coupled to a mechanical power source. Examples of mechanical power sources include engines that output power via a rotating drive shaft. Typically, the drive shaft is coupled to other devices that consume the energy provided by the rotating drive. For instance, welding systems often include internal combustion engines (such as gas or diesel engines) and an alternator or generator configured to convert the mechanical energy generated by the engine into electrical energy (e.g., electrical current). These systems are often referred to as engine-driven welding generators. An advantage of an engine-driven system is the potential portability of the system. For instance, welding systems that employ a generator coupled to an engine are typically configured as standalone units that do not have connections to a supplemental power source, such as a power grid. This may be useful for systems that are traditionally operated at remote worksites.

In addition to needing a source of welding current at a worksite, welding operators often desire other outputs to more efficiently complete a job. For example, a welding operator may desire to have an alternating current (AC) power output to power other electrical devices and tools, or desire to have compressed air to operate plasma cutters, air tools, and the like. Thus, it may be desirable to provide a welding system that includes additional devices, such as additional power generators, configured to provide the desired outputs. However, adding multiple devices to a welding system creates additional concerns. For instance, an engine may produce a limited amount of power and, thus, the power desired to operate the multiple devices may exceed that amount of power that the engine can efficiently supply. As a result, the loading of the engine may cause an overload condition, resulting in a decrease in system performance.

BRIEF DESCRIPTION

A system, in one embodiment, may include a portable unit having an engine, a generator coupled to the engine, a compressor coupled to the engine, and a priority load controller. The controller may be configured to adjust various loads on the engine, the generator, or the compressor, or a combination thereof, in response to a priority control scheme. A computer-implemented method, in another embodiment, may include adjusting power output to various loads on an engine, a welding generator coupled to the engine, or an air compressor coupled to the engine, or a combination thereof, in a portable welding unit in response to a priority control scheme.

DRAWINGS

These and other features, aspects, and advantages of the present invention will become better understood when the following detailed description is read with reference to the accompanying drawings in which like characters represent like parts throughout the drawings, wherein:

FIG. 6 is an exemplary embodiment of a priority scheme implemented within the method as illustrated in FIG. 5.

DETAILED DESCRIPTION

Figure 1:
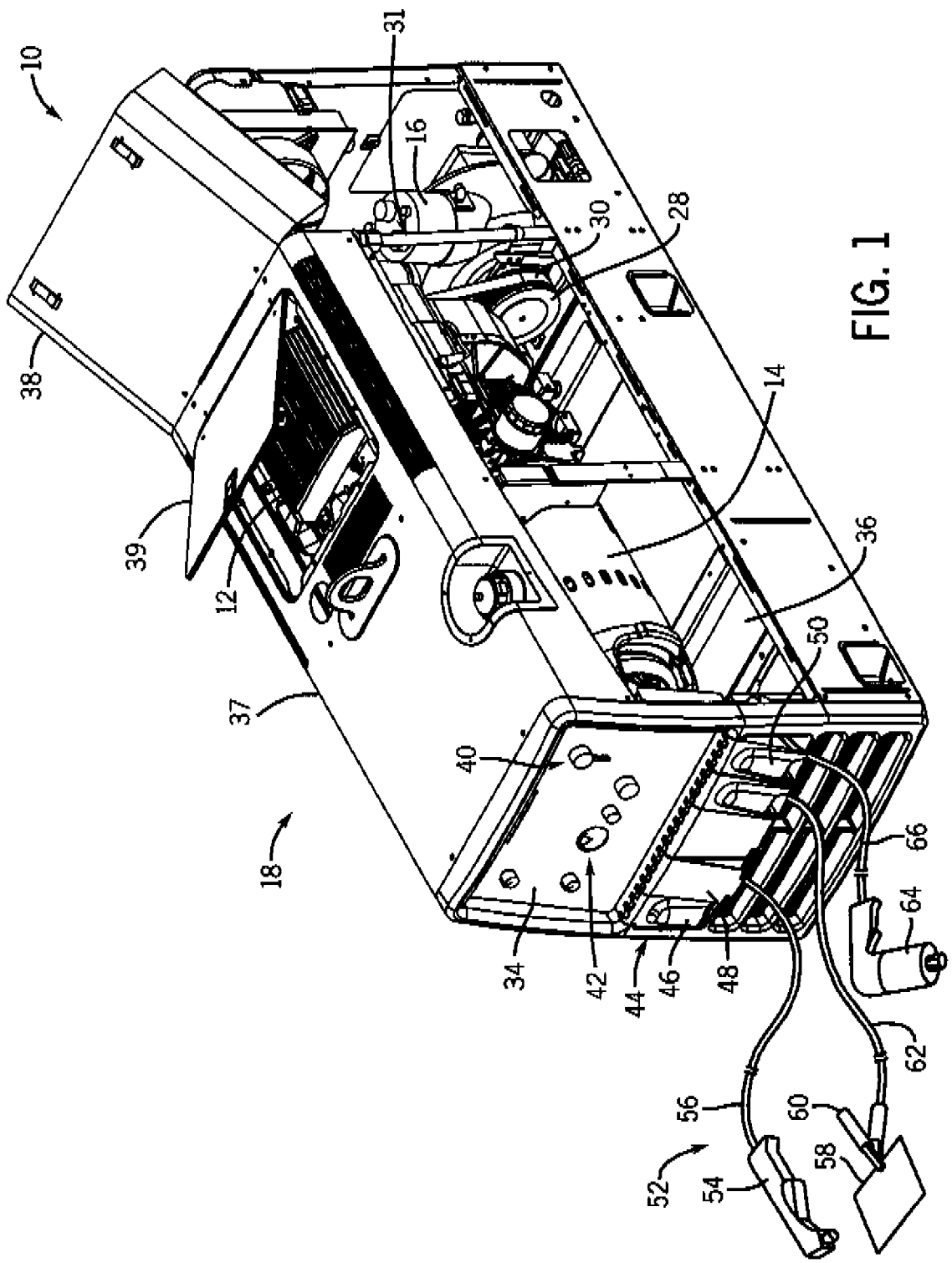
FIG. 1 is a partial perspective view of an exemplary engine-driven welding generator/compressor system, wherein two top access panels are rotated to open positions and a side access panel is removed to reveal various internal features in accordance with embodiments of the present invention.
Figure 2:
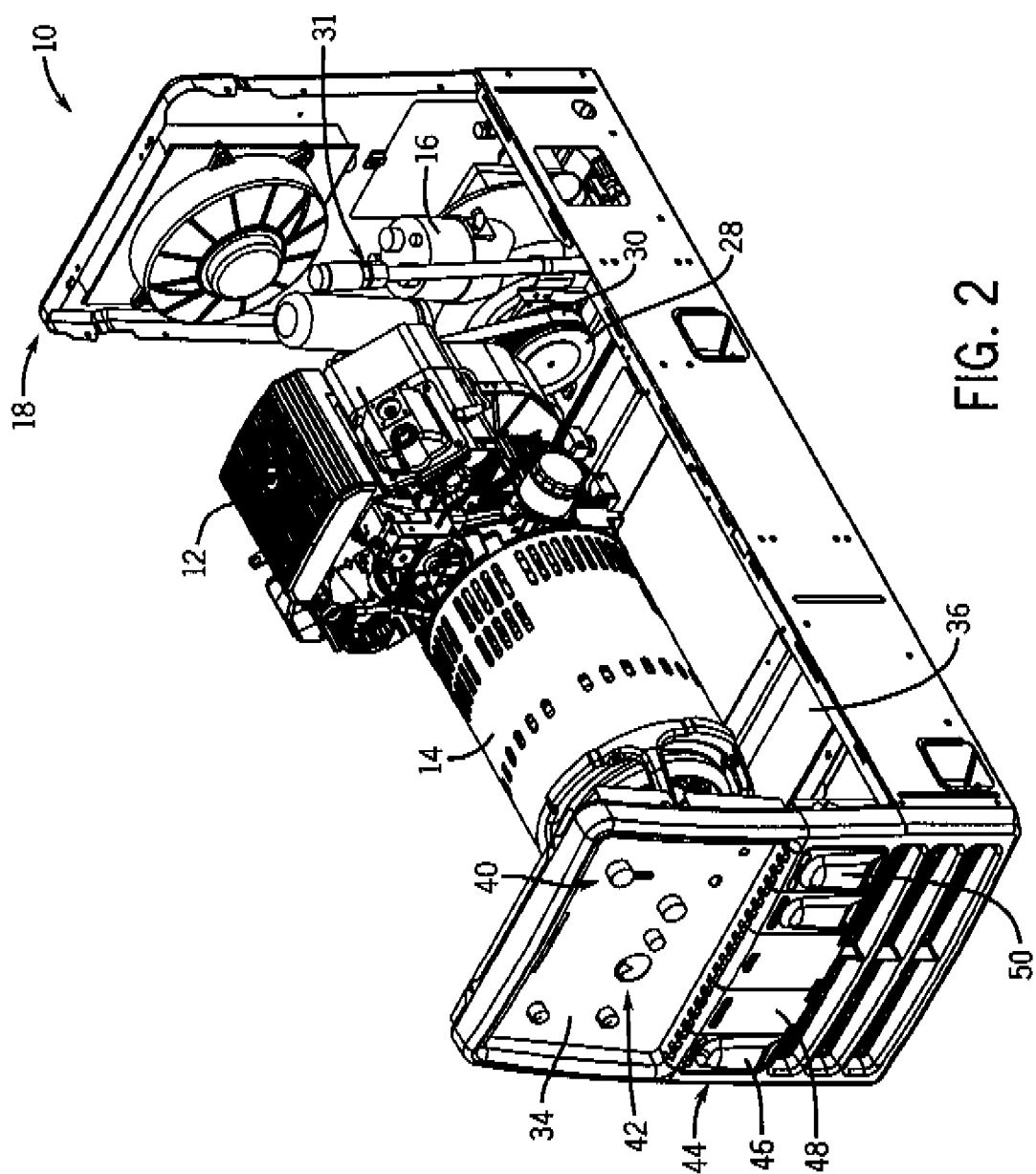
FIG. 2 is another partial perspective view of the welding generator/compressor system as illustrated in FIG. 1, wherein an entire top access panel assembly is removed to further illustrate various internal features in accordance with embodiments of the present invention.
Figure 3:
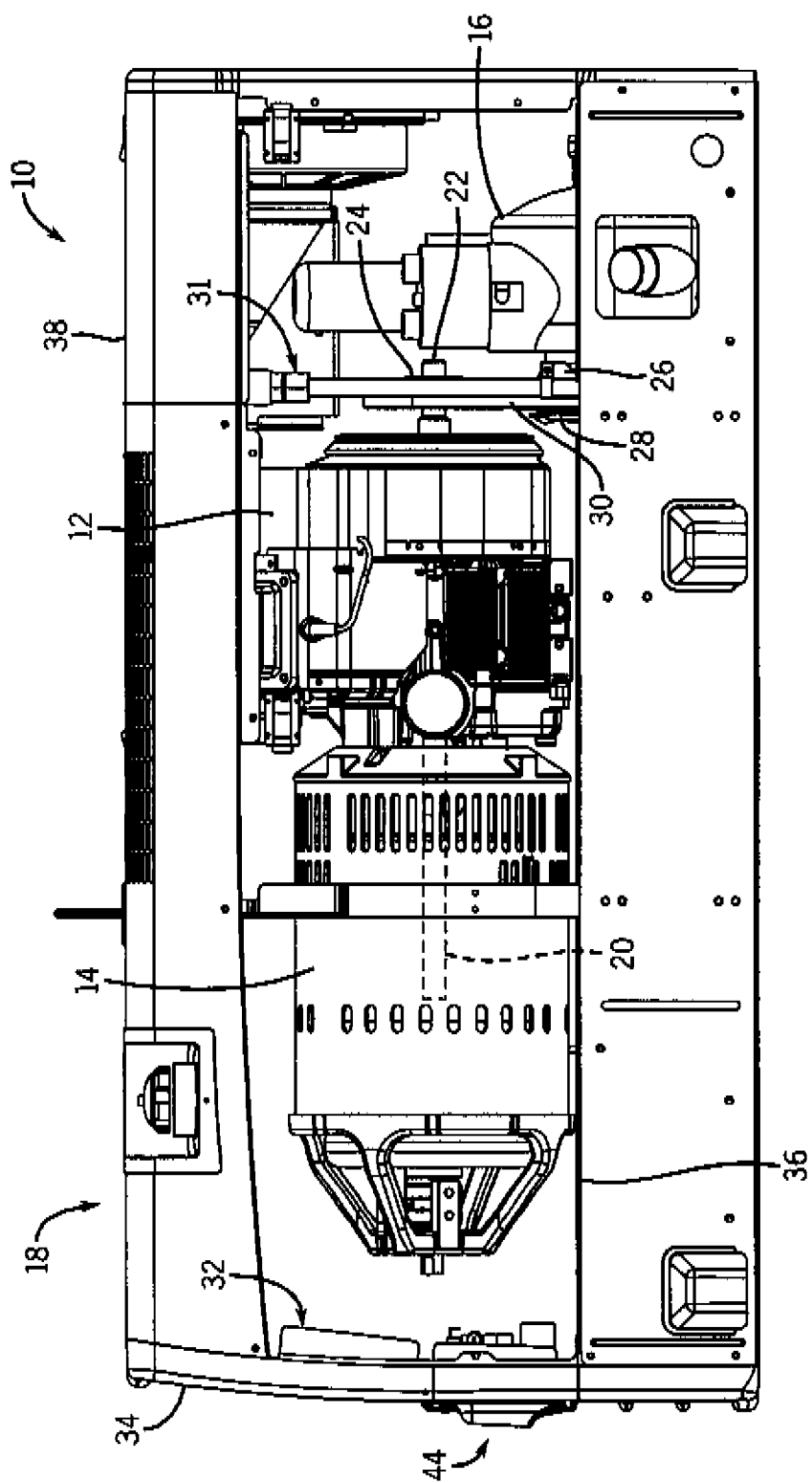
FIG. 3 is a side view of the welding generator/compressor system as illustrated in FIG. 1, wherein the two top access panels are rotated to closed positions and the side access panel is removed to further illustrate various internal features in accordance with embodiments of the present invention.

Referring now to the drawings, FIGS. 1-3 illustrate an engine-driven welding generator/compressor system 10 having an engine 12 drivingly coupled to a welding generator 14 and an air compressor 16 in a single enclosure 18 in accordance with an exemplary embodiment of the present technique. FIG. 1 is a partial perspective view of the system 10 with side access panels removed and top access panels or hatches rotated to open positions. FIG. 2 is another partial perspective view of the system 10 as illustrated in FIG. 1, wherein the entire top access panel assembly is removed to provide a better view of the internal features of the system 10. FIG. 3 is a side view of the system 10 as illustrated in FIGS. 1 and 2. As depicted, the system 10 is configured to provide multiple outputs, including welding current, alternating current (AC) power, and compressed air.

As discussed in detail below, the illustrated system includes a variety of features to improve serviceability, reliability, controllability, and integration of the air compressor 16 within the single enclosure 18 of the system 10. For example, the illustrated system 10 may include a top side oil fill to enable access at the top of the system 10, rather than a lower or more inaccessible oil fill location. The illustrated system 10 also may include unique control features, such as a load priority control configured to monitor various loads (e.g., generator 14, compressor 16, external loads, etc.) on the engine 12, identify possible overload conditions, and adjust the various loads based on priority levels. The control features also may include a specific air compressor load control, which may be configured to reduce the engine speed and/or gradually engage (e.g., via a clutch) the air compressor 16 during start up (e.g., a soft start control). Furthermore, the control features may include a specific air compressor control regulator, which may be mounted directly on a control panel (e.g., a front panel) of the system 10 rather than being in an inaccessible position well within the system 10. The system 10 also may include a battery and/or a battery charge system, which may include features to monitor conditions of the battery (e.g., internal or external to the system 10) and to adjust the characteristics of the charge (e.g., variable output level, duration, etc.).

As discussed in greater detail below, some embodiments of the system 10 include a priority control configured to regulate which devices of the system 10 consume power from the engine 12 and/or generator 14. The priority control provides outputs configured to regulate the power consumed by each of the devices. For instance, in certain embodiments, the priority control may transmit a signal to an electronic clutch, relay, or other controlling device, wherein the signal is configured to regulate the amount of power consumed by each respective device. In an embodiment, the priority control includes an input and/or output to monitor and/or control the operation of the engine 12, the generator 14, the compressor 16, additional devices or loads, or a combination thereof. In further embodiments, the priority control includes a method of control configured to increase, reduce or eliminate the power consumption of the devices based on a priority scheme. The priority of each device may be determined by referring to a predetermined scheme stored in a memory or a user dictated priority scheme, for example.

In certain embodiments, the system 10 may be described as an air pack welding system (e.g., AIRPAK). The engine 12 provides output power (e.g., a mechanical output) to drive both the welding generator 14 and the air compressor 16. In the illustrated embodiment, the generator 14 is coupled to one side of the engine 12, while the compressor 16 is independently coupled to an opposite side of the engine 12. Thus, the engine 12 is sandwiched between the generator 14 and the compressor 16. In addition, the engine 12 may be mounted independently from the compressor 16, such that the two are mechanically isolated from one another. As discussed in further detail below, the isolation between the compressor 16 and the engine 12 may be addressed with a suitable engine-to-compressor coupling system, such as a geometrically adjustable coupling. The geometrically adjustable coupling may include a tensioning system coupled to a belt and pulley system, a special resilient or spring-like belt, a clutch, or a combination thereof, to provide some degree of flexibility, positional adjustability, or play. Thus, the geometrically adjustable coupling is configured to maintain a connection between the compressor 16 and the engine 12 despite variations in distance, vibrations, and so forth. In other words, the geometrically adjustable coupling provides a resilient or distance adjustable connection between the engine 12 and the compressor 16.

As described below, the power from the engine 12 operates both the generator 14 and the air compressor 16 via a first shaft 20 and a second shaft 22 (e.g., stub shaft), respectively. In some embodiments, these shafts 20 and 22 may be independent from one another, while in other embodiments shafts 20 and 22 may be part of a single shaft extending through the engine 12. As illustrated, the shafts 20 and 22 extend out of opposite sides of the engine 12. These shafts 20 and 22 may be directly or indirectly coupled to one or more driven mechanisms. For example, an indirect coupling may include a belt and pulley system, a gear system, or a chain and sprocket system. In the present embodiment, the first shaft 20 couples directly to the generator 14, while the second stub shaft 22 couples indirectly to the compressor 16. However, either arrangement can be used for the connection between the engine 12 and the generator 14 and/or the compressor 16.

For example, as will be discusses in greater detail below, the engine 12 is coupled to the compressor 16 via a belt and pulley system including the stub shaft 22, a pulley 24 coupled to the shaft 22, a compressor drive shaft 26 coupled to the compressor 16, a compressor pulley 28 coupled to the shaft 26, and a drive belt 30 extending about the pulleys 24 and 28. Therefore, the engine 12 is capable of providing power to the generator 14 and the air compressor 16 simultaneously. In the illustrated embodiment, the engine 12 rotates the stub shaft 22 to transmit rotation and torque via the pulleys 24 and 28 and drive belt 30 to the compressor drive shaft 26 coupled to the air compressor 16. Accordingly, the mechanical energy generated by the engine 12 operates the air compressor 16. As discussed in detail below, in certain embodiments, the air compressor 16 includes a rotary screw compressor. Thus, the air compressor 16 and the system 10 may be capable of continuously providing large volumes of compressed air 16 to a desired application, such as a welding application, without any need for an intermediate storage tank.

The engine 12 includes a power source configured to provide power to the generator 14 and the air compressor 16. In an embodiment, the engine 12 may include a combustion engine powered by gas, diesel, LP fuel, natural gas, or other fuel, and driving one or more drive shafts, e.g., 20 and 22. For example, the engine 12 may include an industrial gas/diesel engine configured to output anywhere from about 24 horsepower (Hp) to about 64 Hp. Generally, the weight of such an engine 12 may vary with the size and Hp rating of the engine. For example, a 64 Hp diesel engine driven unit may weigh approximately 1900 lbs., whereas a similar 24 Hp gasoline engine driven unit may weigh less than approximately 1000 lbs. Thus, the portable system 10 may benefit from the use of a smaller engine 12.

As discussed previously, embodiments may include a generator 14 coupled to the engine 12. Thus, the generator 14 may convert the power output (e.g., mechanical energy) of the engine 12 to electrical power. Generally, the generator 14 includes a device configured to convert a rotating magnetic field into an electrical current (e.g., AC generator). The generator 14 includes a rotor (rotating portion of the generator) and a stator (the stationary portion of the generator). For example, the rotor of the generator 14 may include the rotating drive shaft 20 disposed in a single stator configured to create an electrical current (e.g., welding current) from the rotation of the magnetic field. In an embodiment, the generator may include a four-pole rotor and three-phase weld output configured to provide beneficial welding characteristics. Further, the generator 14 may include a plurality of independent winding sections in the rotors and/or stators, such that the generator 14 is configured to output multiple electrical outputs having different characteristics. For example, the generator 14 may include a first section configured to drive a welding current to a welder and a second section configured to drive a current for other AC outputs. As suggested above, multiple generators 14 may be connected to the drive shaft 20 or stub shaft 22.

Also coupled to the engine 12, the air compressor 16 may provide a continuous source of compressed air for use in plasma cutting, pneumatic tools, inflating a tire, blowing-off/cleaning a work piece, and the like. For example, a welding operator may use compressed air as a high speed gas ejected from the nozzle of a plasma torch, or may use compressed air to operate tools, such as pneumatic impact wrenches, pneumatic spray guns, pneumatic lifts, and pneumatic air chisels. In the illustrated embodiment, the air compressor 16 may be described as a continuous air supply compressor, an indirect mount air compressor, or both. For example, certain embodiments of the system 10 use a type of the compressor 16 that is not a piston-type air compressor mounted directly to the engine 12. In an embodiment, the air compressor 16 may include a rotary screw compressor or another suitable compressor 16 configured to supply a continuous flow of compressed air without the need for an intermediate storage tank.

Rotary screw compressors may include a type of gas compressor that has a rotary type positive displacement mechanism. The rotary screw compressor typically includes one or more screws, which rotate within an enclosure to gradually shrink a series of passages defined by threads of the screws and the surrounding enclosure. For example, the rotary screw compressor may include a plurality (e.g., pair) of counter rotating screws, which intermesh with one another to progressively reduce air volumes between the intermeshed threads (e.g., a series of shrinking volumes of air). For example, air is drawn in through an inlet port in the enclosure, the gas is captured in a cavity, the gas is compressed as the cavity reduces in volume, and the gas is finally discharged through another port in the enclosure. The design of a rotary screw air compressor 16 generally provides for high volumes of compressed gas in a continuous manner without the need for an intermediate storage tank.

Accordingly, the rotary screw air compressor 16 may provide a direct supply of compressed air on-demand to a desired application. For example, a plasma cutter may consume air directly from the unit without the air being compressed into a tank, as generally done by piston-driven air compressors. However, an embodiment including a rotary screw air compressor 16 may include an air tank configured to store the compressed air. For example, a user may want to generate air for a given period and store the compressed air for a later use.

Further, the rotary screw air compressor 16 may be configured to operate at high speeds and, thus, may use less gearing and space to couple the rotary screw air compressor 16 to the engine 12. For example, in an embodiment, the system 10 may include a rotary screw air compressor 16 operating at speed near the engine speed, such as 4000 rpm. Thus, the pulley 24 and the compressor pulley 18 may include similar 1 to 1 ratios and not use a significantly larger compressor pulley 28 to step down the engine speed to accommodate the air compressor 16.

The system 10 may also have an oil fill assembly 31 that enables a user to perform regular maintenance on the air compressor 16. For example, as depicted, the oil fill assembly 31 may include a configuration to provide improved access to components of the air compressor 16 that may otherwise be obscured by other devices within the system 10. Accordingly a user may easily check and add fluids to the air compressor 16. For example, the oil fill assembly 31 may be described as an extension, add-on, or retrofit system configured to relocate the oil fill location from well within the system 10 to a top access location.

The system 10 may also include control circuitry to coordinate functions of a plurality of devices. For example, as depicted in FIGS. 1-3, the system 10 includes control circuitry 32 in the vicinity of a control panel 34. In an embodiment, the control circuitry 32 may include a processor, memory, and software code configured to control and or coordinate operation of the system 10. For example, the control circuitry 32 may monitor and control the speed and load on the engine 12, the electrical output and loads on the generator 14, the air output and loads on the compressor 16, the startup procedures (e.g., soft start of compressor 16), and/or the like. For example, as mentioned above, the control circuitry 32 may identify an overload condition in response to sensed data, and then reduce the output to protect the system 10. The control circuitry 32 also may reduce the engine speed, gradually increase the engine speed, and/or gradually engage a clutch during start up of the compressor 16. The control circuitry 32 also may automatically adjust the outputs (e.g., compressed air output or electrical output) based on default or user defined priority levels, minimum workout output levels, maximum output levels, safety features, and so forth. The control circuitry 32 also may adjust output levels (e.g., compressed air output or electrical output) based on a particular application, sensed feedback, and other closed-loop controls. For example, the control circuitry 32 may gradually decrease an electrical output for a battery charging procedure based on sensed feedback from the battery, thereby maximizing the charge without overcharging the battery.

As depicted in FIGS. 1-3, the enclosure 18 includes a common base or frame 36 with various access panels to enable servicing, repair, and so forth. For example, a pair of side access panels (removed) is configured to attach to opposite sides of the frame 36. A top 37 of the enclosure 18 includes first and second access panels or hatches 38 and 39, which are both rotatable between open and closed positions above the components of the system 10. As illustrated, the first hatch 38 can rotate open to enable access to the compressor 16, the oil fill assembly 31, and other features. The second hatch 39 can rotate open to enable access to the engine 12 and other features.

As depicted, the control panel 34 is coupled to an end of the enclosure 18 near the generator 14. The control panel 34 may include various control inputs, indicators, displays, electrical outputs, air outputs, and so forth. In an embodiment, a user input 40 may include a knob or button configured for a mode of operation, an output level or type, etc. For instance, the user input 40 may include a dial to select a mode of operation, such as a DC weld, an AC weld, a battery charge, or an air tool operation. The control panel 34 may also include various indicators 42 to provide feedback to the user. For example, the indicator 42 may include an LCD, LED, or Vacuum Florescent display to display voltage, amperage, air pressure, and the like. Embodiments of the control panel 34 include any number inputs and outputs, such as welding methods, air compressor settings, oil pressure, oil temperature, and system power. Further, the user inputs 40 and indicators 42 may be electrically coupled to the control circuitry 32 and enable a user to set and monitor various parameters within the control circuitry 32 and other devices of the system 10.

The illustrated system 10 also includes various external connections 44. The external connections 44 may include various outlets and couplers configured to provide access to the electrical power and the compressed air generated by the system 10. For example, the illustrated external connections 44 include an AC power output 46, a DC power output 48, and a compressed air output 50. In an embodiment these outputs 46, 48 and 50 are coupled to various devices and tools. For example, the AC power output 46 or the DC power output 48 can be coupled to various welding and cutting tools 52. As depicted, the welding/cutting tools 52 included a torch 54 coupled to the external connection 44 via a supply conduit 56. For instance, the welding devices may receive current from the generator 14 via the external connections 44. In such an embodiment, the torch 54 may be used to weld or cut a work piece 58 coupled to the external connections 44 via a work clamp 60 and a cable 62. As will be appreciated, the torch 54 may include various welding devices, such as a TIG (tungsten inert gas) torch, a MIG (metal inert gas) gun, or a plasma cutting torch. Similarly, the system 10 may provide compressed air from the air compressor 16 via the compressed air output 50. For example an air tool 64 may be coupled to the compressed air output 50 via an air hose 66. The air hose 66 may exit the system 10 at various other locations; including the back of the system 10 proximate to the air compressor 16. The air tool 64 may include various pneumatic tools and the like. In another embodiment, a plasma cutting torch 54 may receive power from an external unit (e.g., wall outlet AC power) while receiving compressed air from the air compressor 16 of the system 10.

As discussed previously, the system 10 may include multiple devices working in cooperation to generate welding power, AC power, compressed air, and the like, to a welding torch, a cutting torch, an electrical tool, a pneumatic tool, and so forth. For example, in the illustrated embodiment, a single engine 12 is coupled to the generator 14 and the air compressor 16. Generally, the operation of each device may be controlled by a manual switch controlled by an operator. For example, the operator may turn on the air compressor 16 which, in turn, enables the air compressor 16 to draw power from the engine 12. As will be appreciated, the loading of devices, such as the air compressor 16, may be substantial depending on the specific requirements of each device. A rotary screw air compressor may draw a significant amount of power to maintain a minimum air pressure and oil pressure, for instance. As more devices are added to the system 10, the power demanded by the devices may exceed the power (e.g., electrical, mechanical, pneumatic) produced by the engine 12, the generator, 14, the compressor 16, or a combination thereof. For example, the engine 12 may be overloaded and unable to operate all of the devices simultaneously. Thus, the power output to each device may be reduced in proportion to the limited power, and the available power distributed between all of the devices consuming power from the engine 12. Unfortunately, certain devices may not function properly when operating from the reduced power level. A solution may include a system 10 incorporating a larger and more powerful engine 12 capable of providing increased amounts of power. However, as mentioned previously, as engine size increases, the weight and cost of the engine 12 may also increase. Thus, an embodiment of the present system 10 may include a smaller engine 12 with a reduced power output to increase portability and reduce cost. Accordingly, certain priority control features of the system 10 monitor and control distribution of power to the various devices based on priority levels, available power, and operational conditions. Further, it may be desirable to increase the efficiency of the system 10 by reducing the power generated by the engine 12 when the available power exceeds the demand. The following discussion presents a control system and method configured to monitor operations of the system 10 and distribute power based on a priority scheme.

Figure 4:
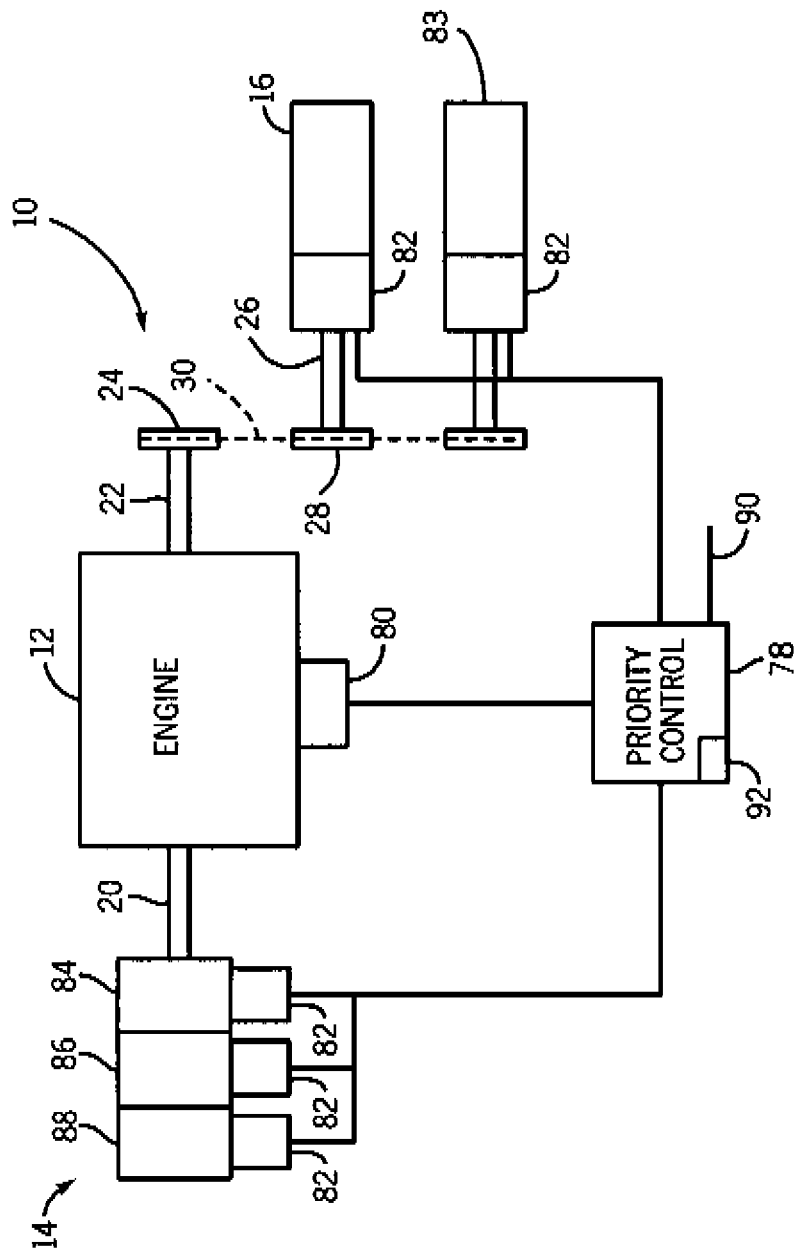
FIG. 4 is a schematic of an exemplary embodiment of the welding system as illustrated in FIGS. 1-3.

FIG. 4 illustrates a block diagram of the system 10, including the engine 12, the generator 14, the air compressor 16, and a priority control 78. In this configuration, the priority control 78 regulates engine speed 12 via a governor 80 and controls the distribution of power to the devices via power regulators 82. As is discussed in detail below, with reference to FIGS. 5 and 6, the priority control 78 may implement a priority scheme to coordinate operation of the governor 80 and the power regulators 82 based on various inputs and parameters.

The governor 80 is generally configured to regulate the speed of the engine, e.g., revolutions per minute (rpm), based on a desired level. In an embodiment, the governor 80 may include an electronic governor 80 configured to control the engine 12 based on the input control signals and monitored engine parameters. For example, the governor 80 may receive a control signal commanding a given speed and the governor 80 may then generate an output signal to control the throttle of the engine 12. The output may include an electrical control of the engine 12 or may include mechanical actuation of the engine throttle.

The control signal may be generated by an external source, such as the priority control 78. In such an embodiment, the control signal may be produced based on a priority scheme embedded within the priority control 78. For example, the priority control 78 may monitor the operating speed and command the governor 80 to increase or decrease the engine speed accordingly. In other embodiments, the governor 80 may include an onboard control loop (such as a proportional-integral-derivative controller (PID controller)) that regulates the output to the engine 12. Thus, the governor 80 can independently regulate the engine 12 to meet the parameters requested by the control signal. In other words, the governor 80 may receive a signal requesting a given speed and implement its own routine to regulate the engine 80 to the desired speed. The governor 80 may include any mechanism configured to receive a control signal and regulate the engine 12 based on the signal.

The governor 80 may be mounted to the system 10 in various configurations that enable the governor 80 to regulate the engine 12. In an embodiment, the governor 80 may be mechanically coupled to the engine 12. Mechanically coupling the governor to the engine 12 enables the governor 80 to manipulate components of the engine 12, including a carburetor throttle shaft, and the like. Mechanically coupling the governor may include providing an engine 12 with a governor 80 built into the engine 12, directly attaching a governor to the body of the engine 12, or providing the governor 80 as a separate component with a linkage to the engine 12. Other embodiments may include electrically coupling the governor 80 to a control circuit located within the engine 12.

The power regulator 82 may be configured to control the amount of power consumed by a device. For instance, the power regulator 82 may include a device configured to reduce the power transmitted to a device and/or may include a device configured to reduce the amount of power consumed by the device. The regulator 82 may include clutches, switches, closed loop regulators on the rotor, a transmission, fluid flow driven controls on the compressor, or other accessories configured to enable, disable, or control the transfer of mechanical power from the engine 12 to a device. For example, in an embodiment including the air compressor 16 and/or another device 83 driven by the rotation of the shaft 22, the power regulator 82 may include a clutch that enables or disables the transfer of torque to the air compressor 16 and/or the device 83. Again, the compressor 16 may be a rotary screw compressor, while the device 83 may be a supplemental air compressor, liquid pump, generator, alternator, cooling system, and so forth. An embodiment of the clutch may include two electromagnetic plates that are complementary to one another. In such an arrangement, the clutch may enable or disable the transfer of torque to the air compressor 16 in response to a control signal. For example, if the power regulator 82 including a clutch receives a signal to engage, the electromagnetic plates may be energized to draw the two plates together and create friction. Energizing the plates may include a digital input configured to fully engage or disengage the clutch or an analog input configured to provide a proportional friction and, thus, a proportional transfer of torque. In an embodiment, the signal configured to operate the power regulator 82 may be generated by the priority control 78.

Further, the location of the power regulator 82 may be varied to accommodate any number of applications. As depicted, the power regulator 82 is located in-line with the compressor drive shaft 26. Similarly, the power regulator 82 may be located in-line with the shaft 22 and be configured to enable or disable the transfer of torque to the pulley 24 and, thus, the torque provided to the air compressor 16. An embodiment may include the power regulator 82 that includes a clutch built into a pulley. For example, the pulley 24 or the compressor pulley 28 may include a clutch pulley configured to transfer torque via engagement in response to the control signal. Further, the power regulator 82 may include a belt tensioning mechanism configured to increase or decrease the tension of the drive belt 30 based on the control signal. Accordingly, the control signal may be configured to enable the power regulator 82 to provide a tension in the drive belt 30 to enable the transfer of torque. Although embodiments of the power regulator 82 including a clutch have been described with reference to the air compressor 16, a similar clutch configuration may be implemented with any devices relying on a similar transfer of mechanical power for operation. In some embodiments, the same clutch, pulley, and belt configuration may be used to couple the engine 12 with the generator 14.

The power regulator 82 may also include other devices configured to regulate the transfer of power from the engine 12 to a device. In certain embodiment, the power regulator 82 may include a relay. For example, where the generator 14 is configured to convert the mechanical power from the engine 12 into an electrical output, the power regulator 82 may include a relay configured to cut-off the power output. Accordingly, the reduction of the electrical load serviced by the generator 14 may reduce the mechanical power consumed from the engine 12. Similarly, in an embodiment where multiple generators, such as a welding generator 84, an AC power generator 86, and a battery charging generator 88, are contained within the system 10, multiple power regulators 82 (e.g., relays) may be coupled to each generator to regulate the output of power and, thus, the power consumed. The generators 84, 86, and 88 may be separate generators or different coil sections of a single generator unit. Similarly, the power regulator 82 may include other mechanisms configured to regulate the power consumed by the devices, including a mechanical switch configured to remove the electrical demand and, thus, remove the power draw from the engine 12.

The priority control 78 may be configured to control various aspects of operation within the system 10, including the engine 12 and devices consuming power from the engine 12. In other words, the priority control 78 may monitor any number of inputs, and also output various commands to control the operating speed of the engine 12 via the governor 80 and the power consumed by each device via the power regulators 82. As depicted in FIG. 4, the priority control 78 is electrically coupled to the governor 80 and the power regulators 82, as well as, other inputs 90.

The priority control 78 may take a variety of forms. Embodiments, of the priority controller 78 may include discrete circuits in a mixed signal analog design, an embedded control system, a computer with Input/Output units, software stored on a computer readable medium or memory, or a complex machine. The priority control 78 may also include a memory 92 configured to store data similar to the data described above. For example, the memory 92 may store data including engine parameters, such as maximum engine power output, maximum oil and coolant temperatures, as well as device parameters, including respective maximum power consumption and minimum power requirements. Further, the memory 92 may store operational parameters including a priority sequence that is discussed in more detail with regard to FIGS. 5 and 6. For example, in an embodiment, a predetermined priority sequence may be stored in the memory 92 and accessed by the priority control 78 during operation. Thus, the priority control 78 may operate based on information stored within the memory 92. The memory 92 may be accessible by a user. For instance, a user may retrieve and write date to and from the memory 92. Thus, the user may access, overwrite, or view various data stored in the memory 92 via the control panel 34 or other communication device. In an embodiment, the user may modify various parameters, such as the maximum engine power output or the priority sequence stored in the memory 92.

The priority control 78 may be configured to transmit various parameters to the governor 80, including a speed control signal indicative of a desired engine operating speed. For example, the speed control signal may include a set level or value representative of the desired engine operating speed. In response to the speed control signal, the governor 80 may regulate the actual operating speed of the engine 12, as described previously.

Further, the priority control 78 may be configured to receive data from the other components of the system 10, including the engine 12, the governor 80, the devices, and the power regulator 82. Data may include the maximum power available from the engine 12, engine speed, oil temperature, coolant temperature, device operating speed, device power consumption, maximum device power consumption, and the like. The data may be provided directly from the engine 12, the governor 80, the devices, the power regulators 82, or other components of the system 10, such as the control circuitry 32. Other data may be provided via other inputs 90. For example, the other inputs 90 may include data provided from surrounding monitoring devices, manual override switches, or general user inputs. The data received by the priority control 78 may be stored in the memory 92 for subsequent use in processing, diagnostics, and the like.

Based on the various inputs and data stored in the memory 92, the priority control 78 may implement a priority control scheme. For example, the priority control 78 may compare the maximum power output of the engine 12 to the power characteristics of the devices and regulate the speed of the engine 12 and the power consumed by the devices. Thus, the priority control 78 may detect the power available from the engine 12, the power consumed by each device within the system, and the priority of each device, and then regulate the engine operating speed and the power consumed by each device to provide a more efficient distribution of power within the system 10. For example, if the engine 12 is not capable of supplying enough power to operate all of the devices at their full potential, the priority control 78 may shut down or reduce the power consumed by a low priority device, and maintain a sufficient power output to higher priority devices. Similarly, if the available power exceeds the power desired (or required) to operate the devices, the priority control 78 may enable all devices to operate at their full potential and reduce the engine operating speed such that excess power is minimized to increase efficiency of the system 10. Accordingly, the system 10 may prioritize loads when the available power is limited, and operate at a more efficient engine operating speed when the power consumed by the devices does not exceed the capabilities of the engine 12.

Figure 5:
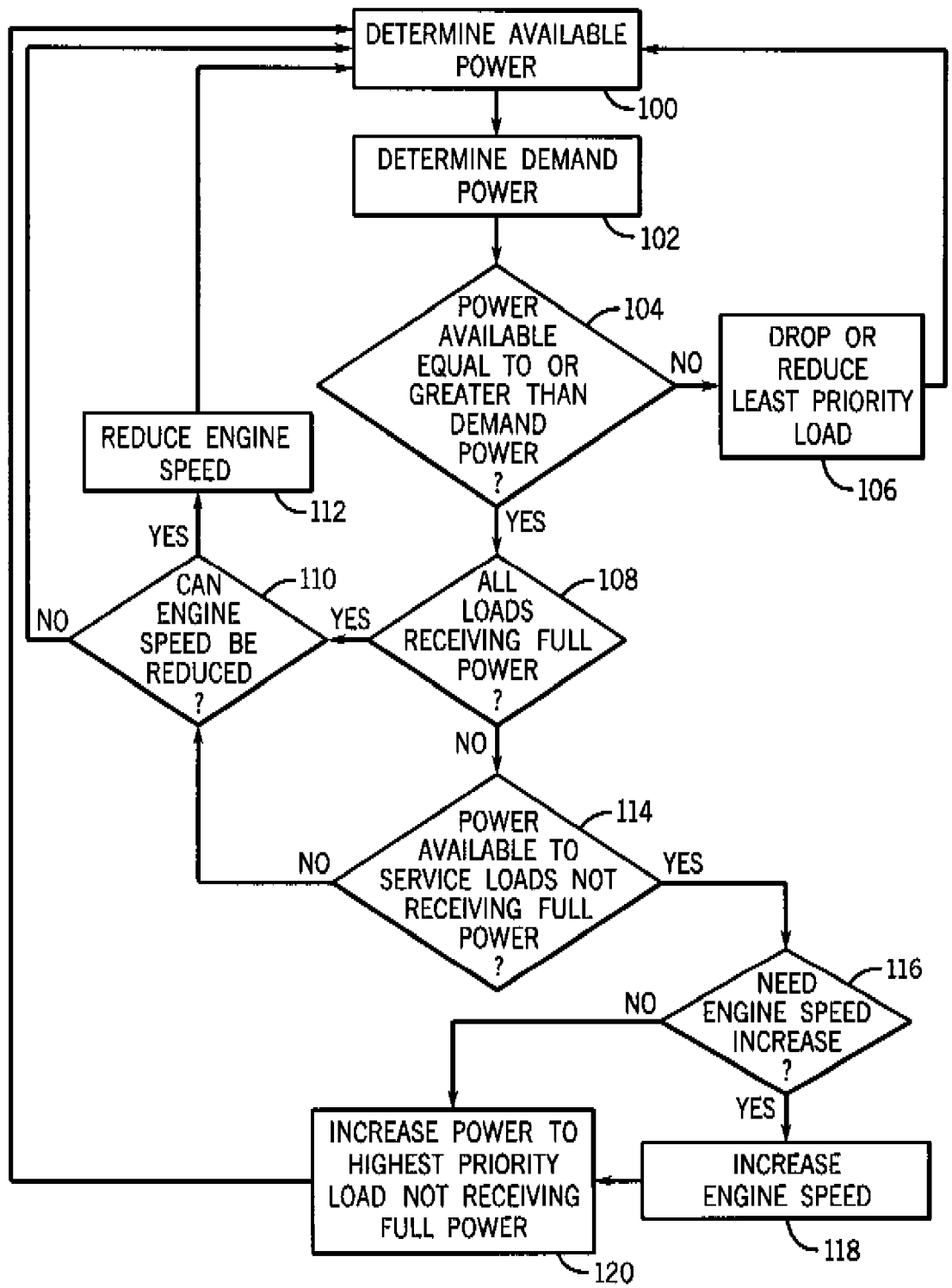
FIG. 5 is a flowchart illustrating an exemplary method of operating the engine driven welding generator/compressor system as illustrated in FIGS. 1-3.

FIG. 5 is a flowchart that illustrates an exemplary computer-implemented method to operate a welding generator/compressor system 10. The method includes identifying the characteristics of the engine 12 and the power demanded by the devices, followed by a sequence to reduce, or eliminate lower priority loads if the engine is not capable of supplying the full power demanded. Further, the system 10 reduces the engine operating speed if the engine 12 is capable of supplying power in excess relative to the power demanded by the devices.

The system 10 may first determine the available power, as illustrated at block 100. Determining the available power 100 may include determining the amount of power output by the engine 12, the generator 14, the compressor 16, or a combination thereof, for consumption by various devices. For example, an engine with a 64 Hp rating may be capable of outputting approximately 47.7 kW of power, assuming that the entire 64 Hp is transmitted as an output. The available power may also be determined by other methods, including measuring the actual power output by the engine 12. For example, the available power may be calibrated at the time of manufacture and stored in the memory 92. In another embodiment, the available power may be monitored by the system 10 and stored in the memory 92. For example, the priority control 78 may monitor the operating characteristics of the engine 12 and detect a reduction in engine operating speed, or other system parameters, under certain loading conditions. Based on the response of the engine 12 to the loads, the priority control 78 may store this value as the available power of the system 10. This method may prove useful to account for variation in engine performance over the life of the engine 12.

The system 10 may also determine the demand for power, as illustrated at block 102. Determining the demand for power may include the priority control 78 determining the maximum amount of power consumed by the devices. For example, if the system 10 has three of five devices consuming power (i.e., turned on), the power demanded may include the sum of the power desired or required to operate the three devices at maximum power. Similarly, if all five devices are consuming power, power demanded may include the sum of the power to operate the five devices at maximum power. For simplicity, the system 10 may simply determine the sum of the power to operate the five devices, even if all five of the devices are not consuming power. Examples of loads may include the load of the air compressor 16, the generator 14, and the like.

In another embodiment, determining the demand power 102 may include the system 10 considering the actual demand for power. For example, the priority control 78 may monitor each of the devices to determine the power being consumed by each respective device during operation. Monitoring may include receiving and processing signals indicative of the device speed or other data indicative of the power consumed, such as the power output by each of the devices. The priority control 78 may then compare the sum of the power consumed by each of the devices to determine the demand power 102. Embodiments may also include providing an additional factor to maintain an available power that is greater than the demand power. For example, an additional amount of power may be added to the sum of the power consumed by the devices to ensure that the power available is capable of supporting fluctuations in the power demanded by the devices.

Based on the available power and the demand power, the system 10 may then determine if the power available is equal to or greater than the demand power 104. In an embodiment, this may include comparing the available power from block 100 to the demand power of block 102. For example, after making the determinations in block 100 and block 102, the priority control 78 may subtract the demand power from the available power to determine if a power surplus or power shortage exists. Similarly, an embodiment may combine the steps of block 100, 102 and 104 into a single step that includes monitoring various parameters to detect that the power available is equal to or greater than the demand power. For example, the priority control 78 may monitor the engine operating speed and detect a reduction in engine operating speed as indicative that the engine 12 is overloaded and, thus, the power available is not equal to or greater than the demand power. Other embodiments may include monitoring oil temperature, coolant temperature, device power output, and the like.

If the system 10 determines that the power available is not equal to or greater than the demand power, then the system 10 may drop or reduce the least priority load, as depicted by block 106. In an embodiment, this may include prioritizing each load and reducing the power distributed to each load accordingly. For example, an embodiment may include categorizing the overload based on the amount of power demanded in excess of the power available. Such an embodiment may include three categories, including low overload, medium overload, and a high overload. If the overload is low, the system 10 may reduce power to the lowest priority device or devices. If the overload is medium, the system 10 may remove power from the lowest priority device or devices. If the overload is high, the system 10 may drop power to all of the devices, except for those considered the highest priority loads.

The system 10 may drop or reduce loads 106 based on a priority sequence. For example, as depicted in FIG. 6, a priority scheme may include a sequence of steps related to reducing and removing power to devices. As depicted, the priority of devices includes the AC generator power, the welding generator power, the air compressor power, and battery charger power listed from highest priority (1) to the lowest priority (4). Based on this determination, the priority scheme may include a sequence of steps taken in order. For example, at the first detection that the power available is not equal to or greater than the demand power, the system 10 may reduce the battery charger power at block 106. After taking action based on the priority scheme of FIG. 6, the system 10 may return to blocks 100, 102 and 104 to determine if a power overload still exists. If so, the system 10 may return to block 106 and take the next step of the priority scheme, for instance, reducing the air compressor power. The system 10 may continue this process until there is no longer a power overload detected at block 104, or there are no additional steps to take within the priority scheme of FIG. 6. For example, in the fourteenth iteration though block 106 of FIG. 5, subsequent to reducing AC power at step 13 of the priority scheme of FIG. 6, the system 10 may not be able to make any additional reduction or drops of power outputs. As discussed briefly above, the priority and priority scheme of FIG. 6 may be predetermined and saved into a memory 92 of the system 10 and the priority control 78 and/or may be modified by a user.

Returning now to block 104, if the system 10 determines that the power available is equal to or greater than the demand power, the system 10 may continue to regulate the performance of the engine 12 and the devices. In an embodiment, the system 10 may confirm whether all loads are receiving full power, as depicted at block 108. Such a determination may be made by the priority control 78 to determine whether the system 10 may continue with the same power regulatory scheme in place or whether previously eliminated/reduced power to devices may be allowed to operate at full power consumption.

Where available power exceeds demanded power and all loads (e.g., devices) are receiving full power, it may be indicative of a power surplus. Accordingly, the system 10 may consider whether the operating speed of the engine 12 may be reduced. For example, if the priority control 78 determines that the available power exceeds the demand power by a sufficient amount the priority control 78 may command to reduce engine speed, as depicted at block 112. If the available power does not exceed the demand power by a sufficient amount the priority control may not command a reduction in engine speed 12 as depicted by the return to the beginning of the method of FIG. 5.

Retuning now to block 108, if all loads are not receiving full power, the system 10 and the priority control 78 may consider bringing increasing power to loads that were previously reduced to a limited power level. As depicted at block 114, the system 10 may first consider whether power is available to service loads not receiving full power. For example, the priority control 78 may compare the power surplus to the additional power suitable to remove a power limitation from a device. If it is determined that the system 10 may not service an additional load, then the system may return to block 110 to consider whether the engine speed may be reduced. However, if the system 10 determines that the power surplus is sufficient to service a currently limited load, the system 10 may increase the power supplied to the load. For example, as depicted at block 116, the priority control 78 may consider the current engine operating speed, and determine whether the system 10 needs an engine speed increase, as depicted at block 116, to support the additional load. If no engine speed increase is needed, the priority control 78 may increase power to the highest priority load not receiving full power, as depicted at block 120. However, if the priority control 78 determines that an engine speed increase is needed, the priority control 78 may command an increase in engine speed, as depicted at block 118, before increasing power to the highest priority load not receiving full power, as depicted at block 120.

Similar to the method at block 106, the system 10 and the priority control 78 may rely on the priority scheme of FIG. 6. For example, if the first four steps have been taken to reduce battery charger power twice, reduce the compressor power once, and reduce the welding power once, the system 10 may reverse the previous step taken and increase the battery charger power by the same amount it was previously reduced in step 4 of FIG. 6.

Other embodiment may include determining if power may increase in other locations with the presently available power. For instance if the power reduction in step 1 is small compared to the reductions made in steps 2-4, the system may increase the power that was reduced in step 1 of FIG. 6. This may enable maximizing the power output of the engine 12 without creating an overload.

Finally, the system 10 and the priority control may run the method described in FIG. 6 continuously. Accordingly, the system 10 may dynamically adjust the power output to and consumed by each device, as well as, the operating speed of the engine 12. Thus, the system 10 may enable maintaining the desired power to critical loads when there is a power shortage, and operate the engine 12 at more efficient engine operating speed when there would otherwise be a power surplus generated by the system 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising: a priority load controller configured to adjust various loads on an engine, a welding generator coupled to the engine, and an air compressor coupled to the engine, in a portable welding unit in response to a priority control scheme, wherein the welding generator is coupled to a first power regulator coupled to the engine, and the air compressor is coupled to a second power regulator coupled to the engine, and wherein the priority load controller is configured to output a control signal to operate a governor in response to the priority control scheme, wherein the governor is configured to regulate speed of the engine.

2. The system of claim 1, wherein the priority control scheme comprises a sequence of load changing steps including a change in battery charger power, a change in air compressor power, a change in welding generator power, a change in AC generator power, or a combination thereof.

3. The system of claim 1, wherein the priority control scheme comprises a priority of loads including an AC generator power, a welding generator power, an air compressor power, a battery charger power, or a combination thereof.

4. The system of claim 1, wherein the priority control scheme comprises a sequence of load reduction steps including a reduction in battery charger power, a reduction in air compressor power, a reduction in welding generator power, a reduction in AC generator power, or a combination thereof.

5. The system of claim 1, wherein the priority load controller is configured to adjust the various loads based on feedback comprising an engine speed, an engine output, an engine temperature, an electrical output of the welding generator, an air output of the air compressor, or a combination thereof.

6. The system of claim 1, wherein the priority load controller is configured to output a control signal to operate a power limiting device in response to the priority control scheme.

7. The system of claim 6, wherein the power limiting device comprises a relay, a clutch, or a combination thereof.

8. A system, comprising: a portable unit, comprising: an engine; a generator coupled to a first power regulator coupled to the engine; a compressor coupled to a second power regulator coupled to the engine; and a priority load controller configured to adjust various loads on the engine, the generator, and the compressor, in response to a priority control scheme, wherein the priority load controller is configured to regulate speed of the engine based on the priority control scheme.

9. The system of claim 8, comprising a control panel coupled to the generator and the compressor, wherein the control panel comprises a welding feature and an air compressor feature.

10. The system of claim 9, wherein the portable unit comprises a portable welding unit, the generator comprises a welding generator, the compressor comprises an air compressor, the control panel comprises a pair of welding cable connectors.

11. The system of claim 8, wherein the priority load controller is coupled to a governor configured to regulate speed of the engine in response to the priority control scheme.

12. The system of claim 8, wherein the priority load controller is configured to regulate an actuator mechanically coupling a mechanical output of the engine with a device based on the priority control scheme.

13. The system of claim 12, wherein the actuator comprises a clutch and the device comprises the compressor.

14. The system of claim 8, wherein the priority load controller is configured to regulate an actuator electrically coupling an electrical output of the generator with a device based on the priority control scheme.

15. The system of claim 14, wherein the actuator comprises a relay.

16. The system of claim 14, wherein the electrical output comprises a welding output, a battery charging output, a DC output, an AC output, or a combination thereof.

\* \* \* \* \*